United States Patent [19]

Böhm et al.

[11] Patent Number: 4,607,203

[45] Date of Patent: Aug. 19, 1986

[54] METHOD AND APPARATUS FOR DETERMINING THE POLE POSITION IN A SYNCHRONOUS LINEAR STATOR MOTOR

[75] Inventors: Edgar Böhm, Hemhofen; Erhard Achenbach, Laasphe, both of Fed. Rep. of Germany

[73] Assignee: Siemens Aktiengesellschaft, Berlin and Munich, Fed. Rep. of Germany

[21] Appl. No.: 761,363

[22] Filed: Aug. 1, 1985

[30] Foreign Application Priority Data

Sep. 10, 1984 [DE] Fed. Rep. of Germany ....... 3433149

[51] Int. Cl.⁴ ............................................. G05B 11/00
[52] U.S. Cl. .................................... 318/687; 318/135; 318/587; 104/292
[58] Field of Search ........................ 318/687, 135, 587; 104/290, 292, 293

[56] References Cited

U.S. PATENT DOCUMENTS

| 3,904,942 | 9/1975 | Holtz | 318/687 X |
| 3,914,669 | 10/1974 | Holtz | 104/293 X |
| 4,013,014 | 3/1977 | Holtz | 318/135 X |
| 4,238,715 | 12/1980 | Parsch et al. | 104/292 X |
| 4,505,206 | 3/1985 | Gottzein et al. | 318/135 X |
| 4,509,001 | 4/1985 | Wakabayashi et al. | 318/687 |

FOREIGN PATENT DOCUMENTS 3148007  9/1983  Fed. Rep. of Germany .

*Primary Examiner*—B. Dobeck
*Attorney, Agent, or Firm*—Kenyon & Kenyon

[57] ABSTRACT

At the rotor of a synchronous linear stator motor, a stray flux measuring device (3', 3'') measures the angle $\theta$ of the stator current distribution $\phi$ and a speed-measuring device (4) measures a speed containing faults. At the stator, an angle $\theta^*$ for the impressed stator current distribution is taken off and the difference of the two angles ($\theta^* - \theta$) indicating the stator current distribution is added as a correction signal to the speed (adder 5), from which the pole position (R) is determined by integration. If the pole position R is used to control the frequency of the stator current thereby, a control loop for the angle difference $\theta^* - \theta$ is produced which regulates the measured pole position R to the actual pole position.

8 Claims, 2 Drawing Figures

METHOD AND APPARATUS FOR DETERMINING THE POLE POSITION IN A SYNCHRONOUS LINEAR STATOR MOTOR

BACKGROUND OF THE INVENTION

The present invention relates to a method and apparatus for determining the position of the poles of a synchronous linear stator motor.

A preferred application and embodiment of the invention is the drive of a magnetic suspension vehicle in which the vehicle represents the rotor containing the magnet poles of a synchronous motor while a rail installed along a track is designed as a linear stator and contains the stator windings installed in slots and fed by an inverter. If the flux entering the stator at a given point is designated with $\phi_d$ and a point shifted by a quarter period according to the periodic pole structure of the rotor with $\phi_q$, the flux generated by the stator can be described as a vector with the two orthogonal, rotor-related components $\phi_d$ and $\phi_q$, while the axes d and q, which are shifted magnetically relative to each other by 90°, are correlated to the corresponding points at the stator. Since the geometry of the stator winding is tuned to the pole pitch of the rotor, the relative position of the vehicle within a period of the spatially distributed stator field can be determined by a flux measurement in the rotor (i.e., by a stray flux measurement if the spatial distance from the rotor magnets is large enough).

The vehicle can now be accelerated by means of the magnetic flux, for the generation of which a current is impressed on the stator windings which is given by a certain current distribution corresponding to the accelerating flux. The current to be impressed can likewise be described by two current components $i_d$ and $i_q$ which are described as orthogonal components of a current vector in a coordinate system, referred to the position of the rotor. For presetting the current distribution corresponding to the desired acceleration moment, the desired values for these current components referred to the rotor position can therefore be preset, for instance, by means of a speed control. For controlling the inverters feeding the stator, it is then only still necessary to convert these desired current values referred to the rotor by means of a pole position signal indicating the position of the rotor, into stator-related reference values.

For forming this pole position signal, a slot counter which is arranged in the vehicle and delivers a counting pulse at each passage of a stator slot is shown in FIG. 1 of German Patent Application No. 31 48 007. A pulse train with a speed proportional frequency is generated, from which the pole position signal corresponding to the distance travelled (and therefore to the pole position) is generated by summing. Since, however, some slots may be missing in the stator at switches or other design-related points, the summed counting pulses do not exactly correspond to the pole position. It is therefore provided to measure the angle determining the rotor related stator current density (ampere turns per cm) by means of a measuring device for the stator stray flux and to divide the corresponding angle signal by a stator current signal which is formed at the inverter output by the actual values of the stator currents and indicates the stator-related stator current angle. Thereby, a position signal is formed which is independent of the amplitude of the stator current and by which the counter for the counting pulses is reset with the respective period of this position signal.

If the vehicle enters a line section in which the stator current feed is omitted because of a fault, then the stator stray flux measuring device measures only the residual magnetization of the section and possibly the stray field of the rotor poles, i.e., an irregular measuring signal, while actual stator current values are not available at all. The correction signal required for resetting the counting-pulse counter therefore cannot be formed; the counter rather resets itself periodically.

This known device, however, has the disadvantage that the angle signal for the rotor-related stator current density formed by the stator stray flux measuring device can in many operating states be determined only inaccurately but affects the determination of the pole position signal very significantly via the counter resetting command.

SUMMARY OF THE INVENTION

It is an object of the present invention to provide a different pole position determination method and apparatus, in which the effect of a correction signal which acts as a correction on a pole position signal furnished by a speed measuring device by integration, can be set corresponding to the respective requirements. The method according to the invention readily can be carried out by analog or, particularly, digital techniques. In particular, it requires only one speed measuring device and one stator stray flux measuring device which may, for instance, also be used for the determination of slippage and hunting and for taking them into consideration in the motor control, and can be of simple design. Therefore, only a small amount of technical means is required for determining the pole position exactly.

BRIEF DESCRIPTION OF THE DRAWINGS

The invention will be explained in greater detail in the following detailed description with reference to the drawings, in which.

DETAILED DESCRIPTION

Figure 1:
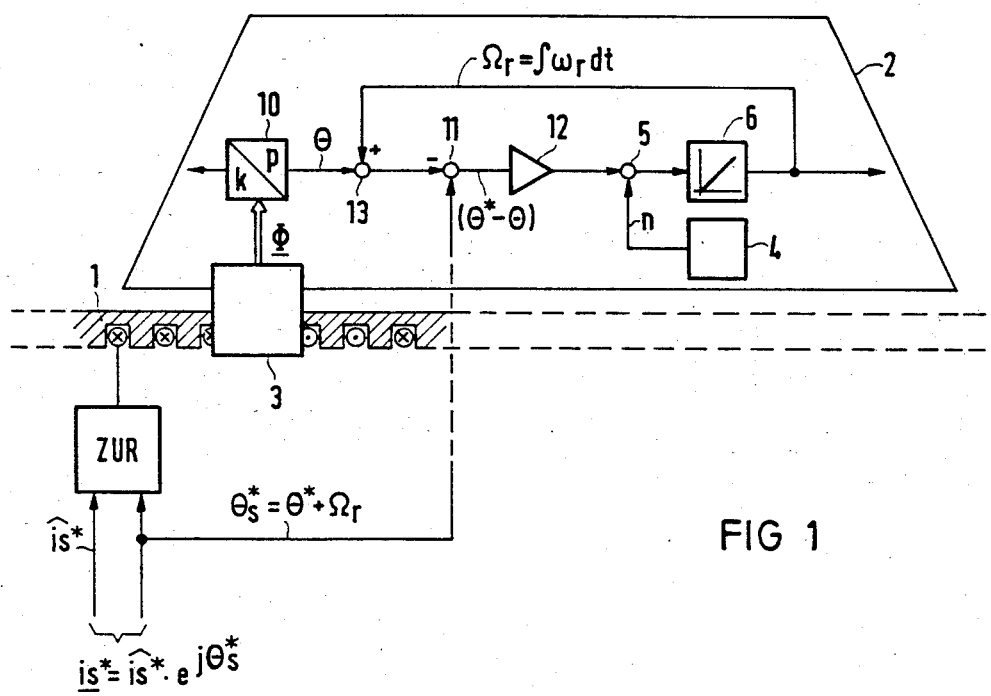
FIG. 1 is a block diagram of a first embodiment of the invention.

With reference now to the drawings, reference numeral 1 designates the linear stator and 2 designates the vehicle containing the rotor of the synchronous motor. The arrows d and q (FIG. 2) designate the rotor axes which are shifted magnetically relative to each other by 90° and are fixed by the arrangement of the stator stray flux measuring device. The linear stator is designed as a rail on supports, so that the stator stray flux measuring device designated with 3 in FIG. 1 can be arranged with the part 3' below and with the part 3" above the linear stator (FIG. 2). The spatial distance of the two axes can be considered, according to the explanations above, as a 90° angle, so that the total distance travelled by the vehicle can be represented as an angle $\Omega_r = \int W_r$ of a vector R rotating with the frequency $W_r$.

In order to keep the vehicle 2 in a desired state of suspension and to accelerate it along the stator 1, the components of the flux must assume at the axes d and q certain values, for the generation of which the stator current generated by an inverter, for instance, an intermediate-link converter ZUR (FIG. 1) or in particular a pulsed inverter PWR (FIG. 2) must be impressed with a distribution which corresponds to the relative position of the axes d and q to the rotor windings ("rotor-related stator current density"). A speed control VR, to which, besides the corresponding speed signal v, for taking into consideration the slippage and for damping oscillations, also the output signal $\phi$ of the stator stray flux measuring device 3 can be fed (information channels, FIG. 2, shown dashed), therefore forms rotor-related actual stator current values. However, the converter requires stator-related (i.e., stationary) control variables for impressing the current. A control device (for instance, a current regulator SR) therefore does not only execute the transition from the desired values of the stator current to corresponding converter control variables but also the transformation of the rotor-related reference values into a stationary reference system.

For this transformation, particularly computing modules are of advantage which process the stator flux, the current distribution or other angle-dependent information as vectors. Thus, the already mentioned rotor-related vector $\phi = \hat{\phi} \exp j\,\theta$, which is measured by the stray flux measuring device 3, represents the magnetization of the motor as to amplitude and direction or, if normalized to the amplitude of the magnetization, the angle distribution of the magnetization. The angle $\theta$ thus describes as the phase of the stator current, the angle of distribution of the inducing stator current in a coordinate system which moves along with the rotor and can be converted by means of the angle $\Omega_r$ describing the rotor position into the angle $\theta_s = \theta + \Omega_r$, which then indicates the stator-related angular distribution of the stator current density (ampere turns per cm).

In the stator-related coordinate system, the angle r corresponds to the polar direction component of a vector $R = \hat{R} \exp(j.\Omega_r)$ and, with the polar amplitude coordinate $\hat{\phi}$ of the vector $\phi$, the angle addition $\theta + \Omega_r = \theta_s$ means a polar transformation of the vector $\phi$ from a rotor-related coordinate system into a stator-related coordinate system. This coordinate transformation (and also the inverse transformation according to $\theta = \theta_s - \Omega_r$) can be carried out likewise for the Cartesian components of the vector $\phi$ for which purpose so-called "vector rotators" are available.

Similarly, the speed control VR (FIG. 2) can make available the reference values for the stator current distribution as (polar or Cartesian) components of a rotorrelated current reference vector i*, where the angle $\theta^*$ as the reference value gives the angle distribution of the stator current density. Taking into consideration the control loops used and the converter serving as the control member for the stator current, stator-related control variables and ultimately stator-related actual values for the stator current which can be described by corresponding vectors is* and is where in any case, if the deviations caused by the control loops and the control member can be neglected, is*=î*.exp (j.106 $_r$)=is, i.e., $\theta_s^* = \theta^* + \Omega_r$ and $\theta^*$ can be set approximately equal to the required angle for the stator current density which can be taken off at the stator.

Figure 2:
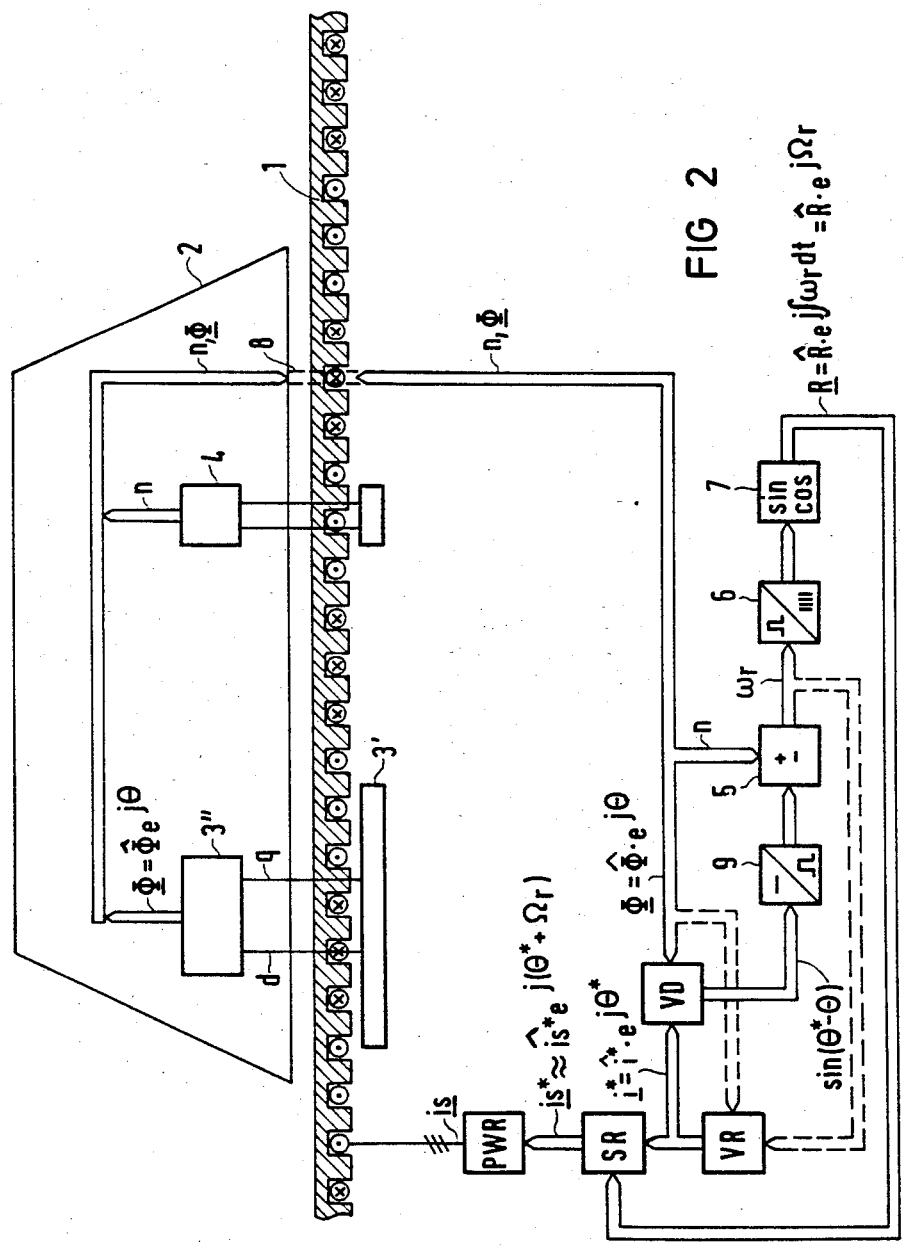
FIG. 2 is a block diagram of a second embodiment of the invention.

For illustrating the method according to the invention, an arrangement is shown in FIG. 1, in which a computer module 10 forms the angle $\theta$ from the flux information which is furnished by the stator stray flux measuring device 3 attached to the rotor as the rotor-related vector $\phi$ of the stator current density (which may be normalized). If an intermediate-link converter ZUR is used for impressing the current, the control variable for the rectifier on the network side of this intermediate link converter represents the reference values is* for the output amplitude, and the control variable for the frequency and phase of the inverter on the load side represent the reference value of the angle $\theta_s^*$ characterizing the stator current density. Thus, the angles of interest are available and the further signal processing takes place in the polar representation of the vectors.

If the angle taken off at the stator (i.e., for instance, the stator-related angle $\theta_s^*$) is to be compared with the angle $\theta$ taken off at the rotor, a transformation of the angle information into a common coordinate system may be necessary which can be accomplished with the determined signal $\Omega_r$ for the rotor position. In FIG. 1, the addition point 13 executes a transformation into the rotor-related system, and the comparison point 11, to which the angle $\theta_s^*$ transmitted without contact from the stator is impressed, therefore forms the angle difference $\theta^* - \theta$ of the two angles.

The coordinate transformation is complete and the amplifier 12 following the comparison point 11 forms the output signal $\theta$ only if the actual pole wheel position (rotor position) is correctly determined by $\Omega_r$. If, on the other hand, a speed signal n determined by a speed measuring device 4 is faulty, the output signal of an integrator 6 connected thereto also indicates the position of the rotor only with errors.

In a variant (not shown), the amplified difference $\theta^* - \theta$ can be impressed as a correction signal on the integrated speed signal at the integrator output and the corrected position signal produced thereby can be fed back for the coordinating information to the addition point 13. Thereby, a control loop is closed which levels out the angle difference with proportional behavior.

In the variant shown in FIG. 1, the amplified angle difference is impressed on the addition point 5 at the input of the integrator 6, whereby a control with integral behavior is accomplished. In the leveled-out state, the integrator output signal $\Omega_r$ then represents the correct pole position.

Since this pole position $\Omega_r$ is required also for impressing the current, for instance, in the current control SR according to FIG. 2, the control loop for the difference $\theta^* - \theta$ can also be closed via the stator current impression. A transformation of the angles taken off at the stator and at the rotor into a common coordinate system is eliminated here if the angle $\theta^*$ is formed as the stator current signal directly from the reference values for i*, which are already preset anyhow with rotor orientation by the speed control VR.

In FIG. 2, processing the angle information in Cartesian coordinates is provided so that the comparison point 11 of FIG. 1 is now replaced in FIG. 2 by a vector rotator VD. In lieu of the angle difference $\theta^* - \theta$, only the component $\sin(\theta^* - \theta)$ of the rotated vector formed by the vector rotator is needed. A pulse generator serves as the speed measuring device 4 which delivers a counting pulse n for each passing of a stator slot, a stator tooth or another line marking fastened to the stator. The pulse train produced thereby, however, always has errors if the line markings, for instance, in the vicinity of a switch, are not uniformly distributed at the stator. The pulse train n as well as the signal $\phi$ taken off at the stator is fed via means 8 with contactless signal transmission to the component (in this case corresponding to components which are arranged at the stator and correspond to the elements 5, 6, 11, 12 of FIG. 1). A pulse generator 9 serves as the amplifier which is frequency-controlled by the angle difference signal sin ($\theta^* - \theta$), and the pulses from the generator 9 are fed, taking into consideration the sign, together with the counting pulses n via an adder 5 as the (now corrected) speed signal v to an integrator 6 realized as a counter.

Since the speed control VR and the current control SR process the reference and control variables for the stator current impression in the form of Cartesian vector components, a sine/cosine function generator 7 finally forms from the counter reading of the counter 6 the corresponding Cartesian components of the vector R.

Since it may be of advantage to provide, for instance, for the suppression of rotor angle oscillations or slippage as well as for the speed control, a device for measuring the rotor-related stator current density and of the speed for speed control, one arrives in this manner at a low-cost pole position determination by means of few additional components. If the vehicle enters a line section in which no stator current flows due to a fault in the current supply, the corresponding correction signal at the amplifier 12 or the converter 9 can be blocked. The vehicle then determines its pole position only from the (possibly faulty) speed signal n. If the vehicle subsequently re-enters an energized line section, a correction signal proportional to the pole position error is again generated and, after the amplifier 12 or the converter 9 is released, the correction of this error begins until the corresponding angle deviation is corrected and the pole position signal $\Omega_r$ correctly represents the actual pole position. If, for instance, at low speeds, only a heavily disturbed signal for the stator current density is available, this does not lead to disturbances of the operation if the influence of the correction signal on the angle control is set relatively low.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for determining the pole position of a synchronous linear stator motor (1, 2) wherein the pole position (R) is obtained by integration (counter 6) of a measured speed signal (n) and is corrected by means of a correction signal (sin ($\theta^* - \theta$)) which is obtained from an angle signal ($\phi$) measured at the rotor (2) for the rotor-related stator current density and a stator current signal (i*) which is provided at the stator (1) and fixes the stator current angle ($\theta^*$ or $\theta_s^*$, respectively), wherein the correction signal is additively superimposed on the measured speed signal (n) or its integral and is determined by compensating the angle difference between the angle ($\theta$) of the stator current density measured at the rotor and the stator current angle ($\theta^*$).

2. The method recited in claim 1, wherein a control loop for equalizing the angle difference is closed by the provision that the rotor-related angle ($\theta$) measured at the rotor and the stator current angle ($\theta_s^*$) provided at the stator are transformed by means of the determined pole position ($\Omega_r$) into a common reference system for forming the angle difference.

3. The method recited in claim 1, wehrein a control loop for equalizing the angle difference is closed via the control (SR) of the stator current.

4. The method recited in claim 3, wherein the stator current signal fixing the stator current angle is formed by the reference values (i*) related to the pole position for the stator current.

5. The method recited in claim 1 wherein the angle signal is obtained at the rotor by measuring the stray field.

6. The method recited in claim 1 wherein the speed signal (n) is obtained by sensing markings on the stator moving past the rotor.

7. Apparatus for determining the pole position of a synchronous linear motor (1,2) comprising:
(a) stator current control means (SR, PWR) which impresses the stator current with an angle distribution which is determined in accordance with a preset position ($\theta^*$) relative to a position of the rotor preset by a pole position signal (R);
(b) stator stray flux measuring means (3', 3'') coupled to the rotor, at which an angle signal ($\theta$) indicating the angle distribution ($\phi$) of the stator current density is taken off;
(c) speed measuring means coupled to the rotor comprising a counting-pulse generator (4) which delivers a counting pulse (n) when passing a mark provided on the stator;
(d) integrator means for the measured speed comprising a counter (6) for the counting pulses (n), at the output of which the rotor position signal (R) is provided;
(e) means (8) for providing a signal exchange between the stator and the rotor;
(f) means (VD) for forming an angle difference signal (sin ($\theta^* - \theta$) ) which indicates the angle difference ($\theta^* - \theta$) between the angle distribution indicated by the angle signal ($\theta$) and the angle distribution ($\theta^*$) impressed on the stator; and
(g) adding means (5) coupled to the integrator (6) and fed by the angle difference signal and the output signal of the integrator means or the measured speed (n).

8. The apparatus recited in claim 7, wherein the stator stray flux measuring means comprises means for the determination of one of slippage and oscillations of the motor and is coupled to the stator current control means via the means for providing a signal exchange.

* * * * *